US005620929A

United States Patent [19]
Hosoi et al.

[11] Patent Number: 5,620,929
[45] Date of Patent: Apr. 15, 1997

[54] METHOD OF MANUFACTURING A GAS FLOW TYPE SENSOR

[75] Inventors: Takashi Hosoi; Mizuho Doi; Nariaki Kuriyama, all of Wako, Japan

[73] Assignee: Honda Giken Kogyo Kabushiki Kaisha, Tokyo, Japan

[21] Appl. No.: 390,362

[22] Filed: Apr. 3, 1995

[30] Foreign Application Priority Data

Feb. 23, 1994 [JP] Japan .................................. 6-064321

[51] Int. Cl.⁶ .................................................. H01L 21/302
[52] U.S. Cl. .................................. 438/50; 438/456; 216/2
[58] Field of Search ............................. 437/225, 241, 437/247, 201, 7

[56] References Cited

U.S. PATENT DOCUMENTS 4,784,721 11/1988 Holmen et al. .............................. 216/2
4,895,616 1/1990 Higashi et al. ........................ 156/647.1
4,952,904 8/1990 Johnson et al. .......................... 257/757

FOREIGN PATENT DOCUMENTS 58-56476 4/1983 Japan .
2226017 9/1990 Japan .

Primary Examiner—Trung Dang
Attorney, Agent, or Firm—Lyon & Lyon

[57] ABSTRACT

A gas flow type sensor with heat-wire bridge having an excellent performance which is attained by optimizing a sputtering process and a heat treatment process for forming a three-layer film (SiN-Pt-SiN) on a semiconductor substrate and improving interfacial adhesion of the three layers and, at the same time, effectively reducing any interfacial stress produced therein. The process comprises a film forming process for sequentially depositing by sputtering SiN, Pt and SiN in three layers on a semiconductor substrate and a heat treatment process for heat treatment of the coated films at a temperature up to 600° C.

14 Claims, 2 Drawing Sheets

METHOD OF MANUFACTURING A GAS FLOW TYPE SENSOR

BACKGROUND OF THE INVENTION

The present invention relates to a method of manufacturing a gas flow type sensor which is used for detecting an angular velocity or an acceleration acting on a sensor body by using a pair of heat wires for sensing a deflection of the gas flow in a gas path of a sensor body when the above-mentioned angular velocity or acceleration is applied on the sensor body.

Recently, as known from Japanese Laid-Open Patent Publication No. 58-56476, such a gas flow type sensor has been developed that has a body comprising a gas path and a pair of heat-wires bridged over the gas path and that is manufactured by semiconductor micro-machining on the basis of IC technology.

In this type sensor, the body portion is constructed of two semiconductor substrates: the lower substrate on which silicon nitride (SiN), platinum (Pt) and silicon nitride (SiN) are sequentially deposited in three layers, a heat-wire bridge is formed by pattern etching the three-layer portion and a half-groove is formed under the bridge by etching the semiconductor substrate, and an upper semiconductor substrate in which a half groove is formed by etching. The upper substrate is bonded to the lower substrate so as to precisely couple the half grooves to form the gas path with the heat-wire bridge.

In manufacturing the sensor, a three-layer coat is formed on the lower semiconductor substrate by sequentially depositing a first (bottom) layer of SiN by a chemical-vapor depositing (CVD) method, a second layer of Pt by a sputtering method and a third (top) layer of SiN by a CVD method. These different methods must be conducted in different working chambers. While the substrate after depositing thereon a SiN-layer in a CVD chamber is transferred to a Pt-sputtering chamber, it may be exposed to air, resulting in oxidization of the SiN-layer. Furthermore, the substrate may be subjected to oxidization of the SiN-layer with air contained in an atmosphere when sputtering the second Pt-layer in the sputtering chamber. The oxidation of the SiN-layer results in port adhesion with the Pt-layer. This may affect the performance of the sensor.

Accordingly, the prior art disclosed in Japan Laid-open Patent Publication No. 2-226017 proposes the provision of an interconnection layer between the SiN-layer and the Pt-layer to improve adhesion between the layers. This solution, however, requires the provision of an additional process of forming an interconnection layer between the working layers, thereby complicating the manufacture of the above-mentioned sensor body.

SUMMARY OF THE INVENTION

Accordingly, it is an object of the present invention to realize a complete process of continuously forming a three-layer (SiN-Pt-SiN) film by sputtering on a lower semiconductor substrate with following heat treatment of the formed film at a temperature up to 600° C. to obtain layers tightly adhered to each other without providing interconnecting layers therebetween in the manufacture of a gas flow type angular velocity sensor which has a body constructed of two semiconductor substrates: the lower semiconductor substrate on which silicon nitride (SiN), platinum (Pt) and silicon nitride (SiN) are sequentially deposited in three layers, a heat-wire bridge is formed by etching the three-layer portion and a half-groove is formed under the bridge by etching the semiconductor substrate, and an upper semiconductor substrate in which a half groove is formed by etching, which upper substrate is bonded to the lower substrate so as to precisely couple the half grooves to form the gas path with the heat-wire bridge.

DESCRIPTION OF THE PREFERRED EMBODIMENT

An embodiment of the present invention now will be described by way of example and with reference to the accompanying drawings.

Figure 1:
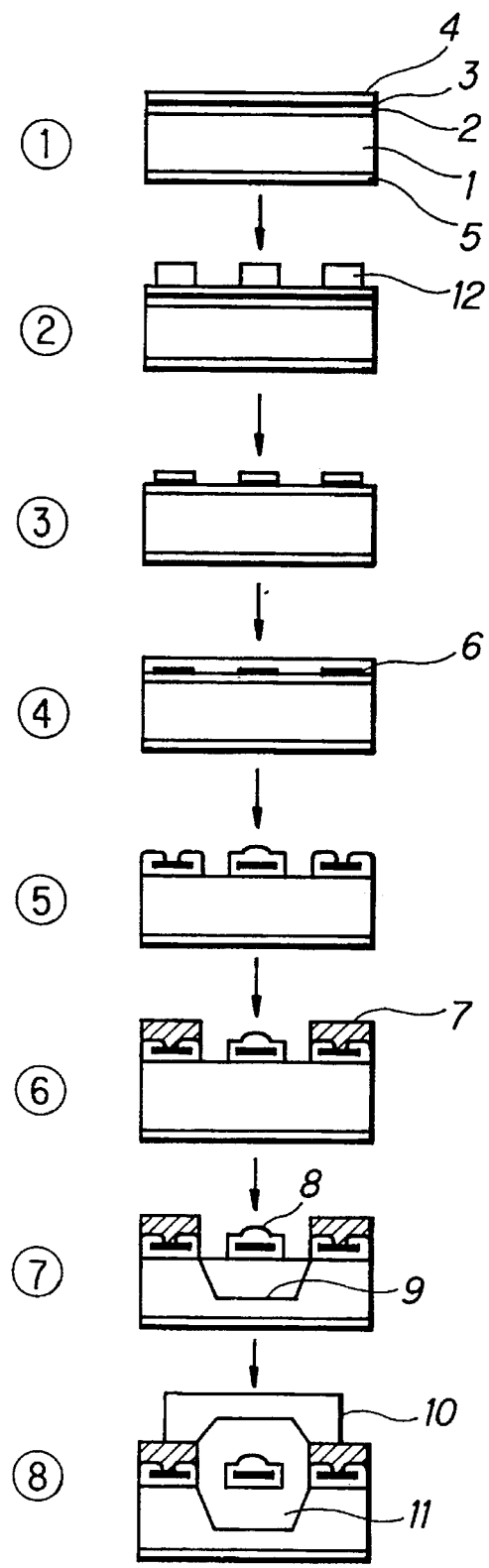
FIG. 1 is a block diagram comprised of FIGS. 1.1 through 1.8 showing the steps of a process for manufacturing a body of gas flow type angular velocity sensor according to the present invention.

FIG. 1 shows a process of manufacturing a body of a gas flow type sensor, which comprises the following steps:

The first step S1 is to sequentially form a 1.2-micron thick SiN-layer 2, a 0.4-micron thick Pt-layer 3 and a 0.2-micron thick SiN-layer 4 by sputter deposition on the top surface of a lower semiconductor silicon (Si) substrate 1 of 700 microns in thickness, which has been previously cleaned from an oxide film formed thereon, and then to form a 0.5-micron thick SiN-layer 5 on the reverse surface of said lower substrate. In this case, the sputter deposition of each SiN-layer is conducted in an atmosphere of argon (Ar)-Nitrogen ($N_2$) mixture (1:2) and the sputter deposition of the Pt-layer is conducted in an argon (Ar) atmosphere.

Steps S2 and S3 are to apply a pattern mask of photoresist 12 onto the three-layer film and to conduct etching of the SiN-layer 4 and the Pt-layer 3 by the method of RIE (reactive ion etching). The etching of the SiN-layer 4 is conducted in an atmosphere of $CF_4$ and the etching of the Pt-layer 3 is conducted in an Ar-atmosphere. The photoresist 12 is then removed. Step S4 is to form a 1.0-micron thick SiN-layer 6 by sputtering over the Pt-SiN film in an atmosphere of Ar-$N_2$ mixture (1:2) and, then, to anneal the three-layer film formed on the lower substrate for about 1 hour at a high temperature of 500° C. to 600° C. to improve the interfacial adhesion.

Step S5 is to apply a pattern mask of photoresist over the three-layer film on the lower substrate and conduct etching of SiN-layers 6 and 2 by the method of RIE in a $CF_4$-atmosphere and then to remove the photo-resist.

Step S6 is to sequentially deposit by vapor a 100-nanometer thick coat of chromium (Cr) and a 1.5-micron thick coat of aluminum (A1) in two layers onto the lower semiconductor substrate, apply a photoresist pattern mask thereto, form electrode portions 7 by wet-etching and then remove the photoresist.

Steps S7 is to form a half-groove 9 with a heat-wire bridge 8 by anisotropically etching the lower Si-semiconductor substrate 1 with a 42.5%-KOH water solution (80° C., at an etch rate of 0.7 microns per minute) and, then, anneal the substrate in an atmosphere of $N_2$ for about 1 hour at a relatively low temperature of 350° C. to remove any remaining interfacial stress.

Steps S8 is to assemble an upper semiconductor substrate 10 having a half-groove etched therein and the lower semiconductor substrate 1 into a sensor body in such a way that both half-grooves are precisely matched to form a gas path 11 therein. The upper and lower substrates are bonded to each other with a sheet-like epoxy adhesive cured at a temperature of 150° C. under a certain pressure.

The above-mentioned process of manufacturing the gas flow type sensor body is featured by continuously forming (sputtering) a SiN-layer 2, a Pt-layer 3 and a SiN-layer 4 on a silicon semiconductor substrate. Consequently, this process can be performed in the same chamber, thereby eliminating the possibility of oxidization of the SiN-layers with the outside air and attaining an excellent quality of adhesion between the SiN-layer 2, the Pt-layer 3 and the SiN-layer 4. This feature can also increase heat-resistance of the three-layer film of the lower substrate, which can be subjected to high-temperature annealing for stabilizing a crystal grain boundary of the three-layer film formed by sputter deposition. If the adhesion between the SiN-layer 2, the Pt-layer 3 and the SiN-layer 4 is poor, peeling may be caused therebetween in the process of annealing and etching.

It is effective to anneal the three-layer film of the lower semiconductor substrate at a temperature up to 600° C. (the optimal annealing temperature may be in the range of 500° C. to 600° C.). Annealing the film at a temperature above 600° C. is not so effective and may be unnecessary. The resistance of heat wires annealed at 600° C. may be reduced by about 7%, which indicates an improvement of the platinum (Pt) crystal quality.

Figure 2:
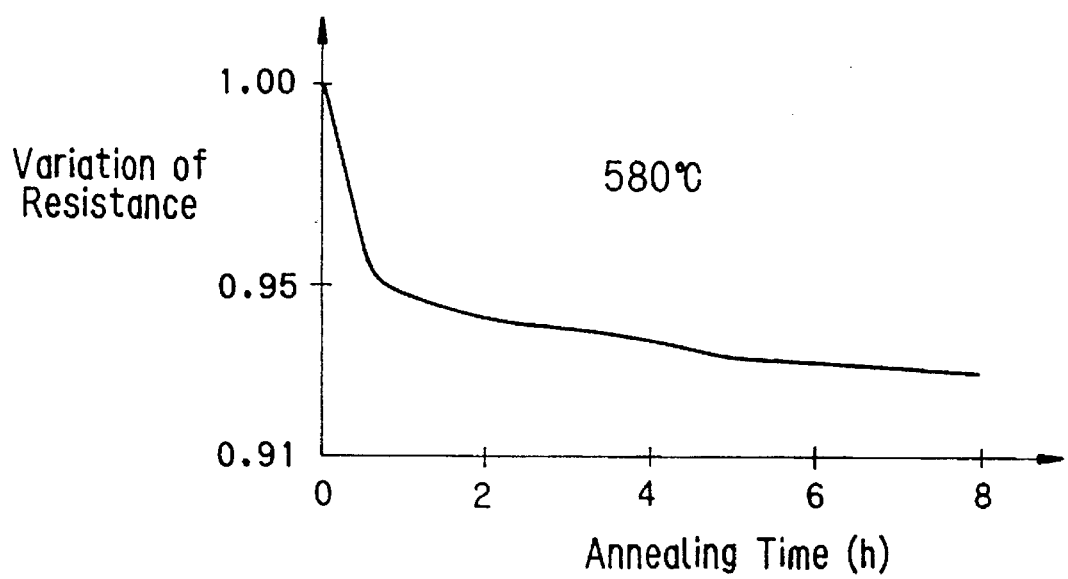
FIG. 2 is a graph showing a characteristic change of resistance in a sample semiconductor substrate having a three-layer (SiN-Pt-SiN) film annealed at 580° C.

FIG. 2 shows a characteristic curve of the change of resistance in a sample semiconductor substrate having a three-layer (SiN-Pt-SiN) film annealed at 580° C., where a maximal reduction of the resistance reaches 7.6%.

Figure 3:
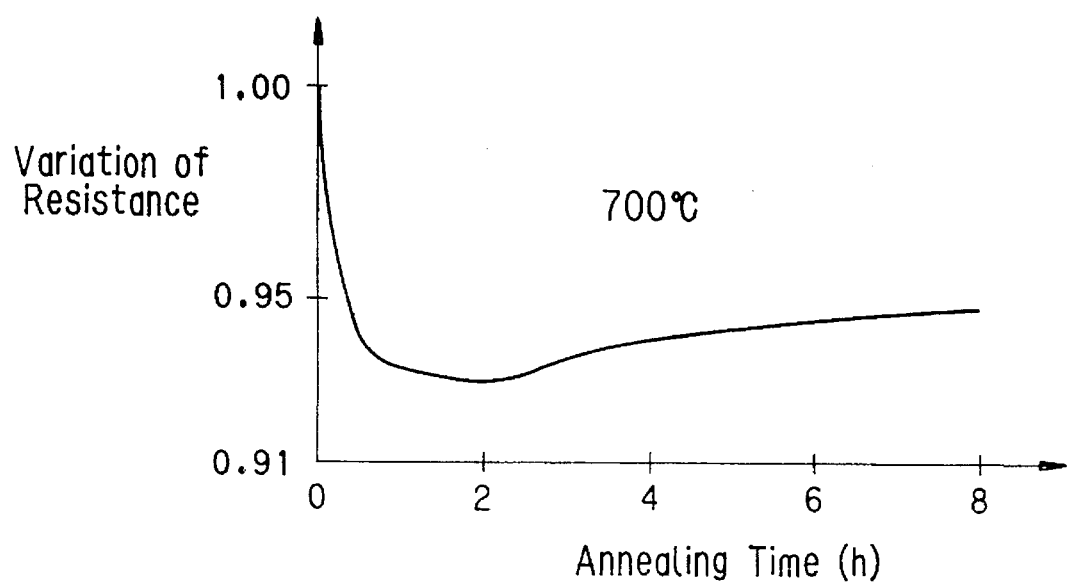
FIG. 3 is a graph showing a characteristic change of resistance in a sample semiconductor substrate having a three-layer (SiN-Pt-SiN) film annealed at 700° C.

FIG. 3 shows a characteristic curve of the change of resistance in the same sample annealed at 700° C., where the resistance of the film starts increasing when the annealing time exceeds 2 hours.

Under usual sputtering conditions, an atmosphere may easily contain dioxide ($O_2$) with which the SiN-layer may very easily react to form silicon oxide (SiNO). This reduces the stability of the three-layer film by decreasing its interfacial adhesion and increasing the etching rate with the KOH solution, thereby affecting the performance of the heat wires to be formed.

The present invention, therefore provides improved sputtering conditions that may effectively prevent the oxidization of SiN-layers 2 and 4 when forming them on the semiconductor substrate. Namely, a mixture ratio of Ar to $N_2$, which is conventionally 2 to 1, is changed to 0.5 to 1 and a sputtering pressure, which is conventionally 0.75 Pa, is decreased to 0.45 Pa. A sputtering temperature, which is conventionally 200° C., is changed to 300° C. It has been proven by experiments that application of the improved sputtering conditions reduces oxygen content in the silicon nitride (SiN) layer by one order or more, considerably improving the performance of the heat wires to be formed.

In the process of forming the SiN-layer 2, the Pt-layer 3 and the SiN-layer 4, an internal stress may be procured in the interfacial connection of these different materials that causes the three layers to warp. This means that the heat wires to be formed may change their resistance values at 300° C. due to a thermal stress if the large internal stress remains in the wires. The solution is to make the interfacial stress between the SiN-layer 2 and the Pt-layer 3 and the interfacial stress between the Pt-layer 3 and the SiN-layer be equal to each other and, at the same time, be reduced as much as possible. For obtaining the three layers having the same value of interfacial stress, it is necessary to form the SiN-layer 2 under the Pt-layer 3 and the SiN-layer 4 over the Pt-layer 3 in the same conditions. According to the present invention, the SiN-layer 2 and the SiN layer 4 are formed in the same sputtering conditions and have the same interfacial stress relative to the Pt-layer 3. The present invention also provides that the lower semiconductor substrate after forming the heat-wire bridge 8 thereon is subjected to low-temperature annealing in $N_2$-gas at 350° C. for about 1 hour to relieve the residual interfacial stress. Namely, the heat-wire bridge 8 which was annealed at 350° C. (relatively higher than the operating temperature (300° C.) of the heat wires) to relieve residual stress therein, may attain a stabilized heat-wire resistance for a short-time aging.

Usually, the Pt-layer 3 serving as a heat wire has a thickness of 0.1 to 0.2 microns, which, therefore, may have an increased resistivity of the heat wire due to an interface influence, a decreased temperature coefficient of resistance and an increased change of resistance at high operating temperature. Accordingly, the present invention provides, as a solution, that the thickness of the Pt-layer 3 is increased to 0.4 microns and an overcoat of SiN is applied to fill up the stepped space at Step S4 of the manufacturing process. This solution has proven to be effective with the result that the characteristic of the heat wire is greatly improved, attaining a drifting of resistance change of not more than 1 ppm/hour after aging of 10 to 20 hours at 300° C. (including an improved performance after being left at a room temperature for a long-period) and an improved temperature-resistance coefficient of 3600 ppm/° C. (in comparison with a value of 3200 ppm° C. of the 0.2-micron thick layer). The sensitivity of the sensor with a thus improved heat-wire bridge has been correspondingly increased.

As will be apparent from the foregoing description, the present invention provides a manufacturing method that can manufacture a gas flow type sensor having an excellent performance by applying an optimized process of forming a three-layer (SiN-Pt-SiN) film by sequentially sputtering respective materials on a lower semiconductor substrate to create thereon a heat-wire bridge followed by heat treatment of the formed film to obtain layers tightly adhered to each other without providing interconnecting layers therebetween.

What is claimed:

1. A method of manufacturing a gas flow type sensor, which includes steps in a process of sequentially depositing silicon nitride, platinum and silicon nitride onto a lower semiconductor substrate to form a three-layer film thereon, etching the three-layer film to form a heat-wire portion according to a specified pattern, etching a part of the lower semi-conductor substrate to form a groove and the heat-wire portion bridged over the groove, bonding an upper semiconductor substrate having a groove etched therein to the lower semiconductor substrate to match the grooves with each other to form a gas path in the assembled substrates, an improvement comprising a sputtering process for continuously forming the silicon nitride layer, the platinum layer and the silicon nitride layer by sputtering deposition on the lower semiconductor substrate with a following heat-treatment of the formed three-layer film at a temperature not exceeding 600° C.

2. A method of manufacturing a flow type sensor as claimed in claim 1, characterized in that the sputtering process is conducted in an atmosphere containing argon gas and nitrogen gas mixed at a ratio of 1 to 2.

3. A method of manufacturing a flow type sensor as claimed in claim 1, characterized in that the sputtering process is conducted at a temperature of about 300° C.

4. A method of manufacturing a flow type sensor as claimed in claim 1, characterized in that the platinum layer is formed to be of at least 0.4 microns in thickness.

5. A method of manufacturing a flow type sensor as claimed in claim 1, characterized in that the sputtering deposition of the two silicon nitride layers is conducted in an atmosphere of one part argon gas and two parts nitrogen gas and the sputtering deposition of the platinum layer is conducted in an atmosphere of argon gas.

6. A method of manufacturing a flow type sensor as claimed in claim 5, characterized in that said sputtering process is conducted in a single chamber in sequential steps with the atmosphere being changed for the respective sputtering deposition steps.

7. A method of manufacturing a flow type sensor as claimed in claim 1, characterized in that said heat-treatment is conducted between 500° C. and 600° C.

8. A method of manufacturing a gas flow type sensor having sequentially deposited silicon nitride, platinum and silicon nitride layers onto a semiconductor substrate to form a three-layer film thereon, an improvement comprising the steps of a sputtering process for continuously and sequentially forming the silicon nitride layer, the platinum layer and the silicon nitride layer by sputtering deposition on the semiconductor substrate, and a heat-treatment of said layers and substrate at a temperature between about 500° C. and 600° C.

9. A method of manufacturing a flow type sensor as claimed in claim 8, characterized in that the sputtering process is conducted in an atmosphere continuously containing at least argon gas.

10. A method of manufacturing a flow type sensor as claimed in claim 8, characterized in that the sputtering process is conducted at a temperature of about 300° C.

11. A method of manufacturing a flow type sensor as claimed in claim 8, characterized in that the platinum layer is formed to be of at least 0.4 microns in thickness.

12. A method of manufacturing a flow type sensor as claimed in claim 8, characterized in that the sputtering deposition of the two silicon nitride layers is conducted in an atmosphere of one part argon gas and two parts nitrogen gas and the sputtering deposition of the platinum layer is conducted in an atmosphere of argon gas.

13. A method of manufacturing a flow type sensor as claimed in claim 12, characterized in that said sputtering process is conducted in a single chamber in sequential steps with the atmosphere being changed for the respective sputtering deposition steps.

14. A method of manufacturing a flow type sensor as claimed in claim 8, characterized in that said heat-treatment is conducted for at least one hour.

\* \* \* \* \*